US009019363B2

(12) United States Patent
MacKay et al.

(10) Patent No.: US 9,019,363 B2
(45) Date of Patent: Apr. 28, 2015

(54) MICROSCOPE STABILITY USING A SINGLE OPTICAL PATH AND IMAGE DETECTOR

(75) Inventors: James F. MacKay, Madison, WI (US);
William O'Brien, Madison, WI (US);
Eric A. Drier, Madison, WI (US)

(73) Assignee: Mad City Labs, Inc., Madison, WI (US)

( * ) Notice: Subject to any disclaimer, the term of this patent is extended or adjusted under 35 U.S.C. 154(b) by 409 days.

(21) Appl. No.: 13/556,996

(22) Filed: Jul. 24, 2012

(65) Prior Publication Data
US 2013/0027518 A1    Jan. 31, 2013

Related U.S. Application Data

(60) Provisional application No. 61/511,369, filed on Jul. 25, 2011.

(51) Int. Cl.
| H04N 7/18 | (2006.01) |
| G02B 21/36 | (2006.01) |
| G02B 21/26 | (2006.01) |
| G02B 21/16 | (2006.01) |
| G02B 27/58 | (2006.01) |

(52) U.S. Cl.
CPC ............ *G02B 21/367* (2013.01); *G02B 21/365* (2013.01); *G02B 21/26* (2013.01); *G02B 21/16* (2013.01); *G02B 27/58* (2013.01)

(58) Field of Classification Search
CPC .. G02B 21/365; G02B 21/367; G02B 21/361; G02B 21/362; H04N 7/18
USPC ....................... 348/79, 80; 382/133, 128, 190
See application file for complete search history.

(56) References Cited

U.S. PATENT DOCUMENTS

| 7,583,853 | B2* | 9/2009 | Taylor et al. ................... 382/276 |
| 8,564,792 | B2* | 10/2013 | Zhuang et al. ................ 356/624 |
| 2008/0032414 | A1 | 2/2008 | Zhuang et al. |
| 2012/0300293 | A1* | 11/2012 | Selvin et al. ................... 359/385 |

OTHER PUBLICATIONS

Capitanio et al., "Position control and optical manipulation for nanotechnology applications," Eur. Phys. J., 2005, vol. 46, No. 1, pp. 1-8.
Carter et al., "Stabilization of an optical microscope to 0.1 nm in three dimensions," Applied Optics, Jan. 20, 2007, vol. 46, No. 3, pp. 421-427.
Kao et. al., "Tracking of single fluorescent particles in three dimensions: use of cylindrical optics to encode particle position," Biophysical Journal, vol. 67, pp. 1291-1300, Sep. 1994.
Smith et. al., "Fast, single-molecule localization that achieves theoretically minimum uncertainty." Nat Methods, 2010, vol. 7, pp. 373-375.
PCT/US2012/048005 Partial International Search Report dated Oct. 8, 2012 (2 pages).
PCT/US2012/048005 International Search Report and Written Opinion dated Jan. 9, 2013 (15 pages).

* cited by examiner

*Primary Examiner* — Michael Lee
(74) *Attorney, Agent, or Firm* — Michael Best & Friedrich LLP

(57) ABSTRACT

Stabilization, via active-feedback positional drift-correction, of an optical microscope imaging system in up to 3-dimensions is achieved using the optical measurement path of an image sensor. Nanometer-scale stability of the imaging system is accomplished by correcting for positional drift using fiduciary references sparsely distributed within or in proximity to the experimental sample.

21 Claims, 4 Drawing Sheets

MICROSCOPE STABILITY USING A SINGLE OPTICAL PATH AND IMAGE DETECTOR

CROSS-REFERENCE TO RELATED APPLICATIONS

This application claims the benefit of priority to U.S. Provisional Patent Application No. 61/511,369, filed Jul. 25, 2012, the disclosure of which is herein incorporated by reference in its entirety.

GOVERNMENT SUPPORT

The invention was made with government support under SBIR 1046762 awarded by the National Science Foundation. The government has certain rights in this invention.

BACKGROUND

Recent developments in biological imaging have pushed the limits of existing microscopes. The instabilities inherent in microscopes lead to positional drift of the imaged sample, and this compromises the precision and accuracy of the imaging. A major contributor to microscope instabilities is sample drift (Carter et al., 2007). Sample drift, or positional drift, is simply movement of the sample relative to the imaging sensor (such as a camera), and it can occur in all three dimensions. For conventional fluorescence microscopy, where resolutions on the order of 500 nm are obtained, sample drifts of 200 nm may be tolerable. In localization-based microscopy a drift of 200 nm or more during acquisition may destroy the high resolution nature of the image. Furthermore, long data acquisition times inherent in localization-based imaging place even higher demands on the stability of the microscope. These methods may routinely take hours to obtain a single image. In localization-based Super Resolution methods, maintenance of microscope stability for very long periods of time is desirable. Approaches that attempt to correct for focal drift in the z-axis often aim to hold the focal distance between the sample and the microscope objective lens fixed.

SUMMARY

In certain embodiments, the invention provides a method of stabilizing an image generated by an optical microscope by applying a light source to a sample, which contains a target element, and a fiduciary element held on a nanopositioning stage. The sample and target element have a positional drift. The light source excites or illuminates the target element and fiduciary element, which emit photons which are detected with an image sensor. The photons emitted by the fiduciary element and the target element are detected by the same image sensor. The positional drift of the sample is corrected using an algorithm configured to calculate the location of the fiduciary element and having closed-loop feedback control of the nanopositioning stage, thereby stabilizing the image.

In certain embodiments, a system and apparatus is described for stabilizing an image generated by an optical microscope. A light source is configured to provide light to a sample and a fiduciary element held on a nanopositioning stage, the sample comprising a target element and having a positional drift. An image sensor is configured to detect photons emitted by the fiduciary element and the target element. A computer having an algorithm configured to calculate the location of the fiduciary element is configured to provide closed-loop feedback control of the nanopositioning stage, such that the position of the target element or sample relative to the fiduciary element is maintained.

In certain embodiments, a non-transitory computer readable medium is provided. The computer readable medium comprises first, second and third instructions executable on a computational device. The first instructions process a command signal received from a camera at a first time point. The command signal is used to calculate the first location of a fiduciary element held on a nanopositioning stage of an optical microscope having a field of view. The second instructions process a sensor signal received from the camera at a second time point. The sensor signal is used to calculate the second location of the fiduciary element. The third instructions compute an error signal derived from the first and second calculated locations of the fiduciary element. The error signal provides closed-loop feedback control of the nanopositioning stage, such that the field of view of the optical microscope is stabilized.

Other aspects of the invention will become apparent by consideration of the detailed description and accompanying drawings.

DETAILED DESCRIPTION

Figure 1:
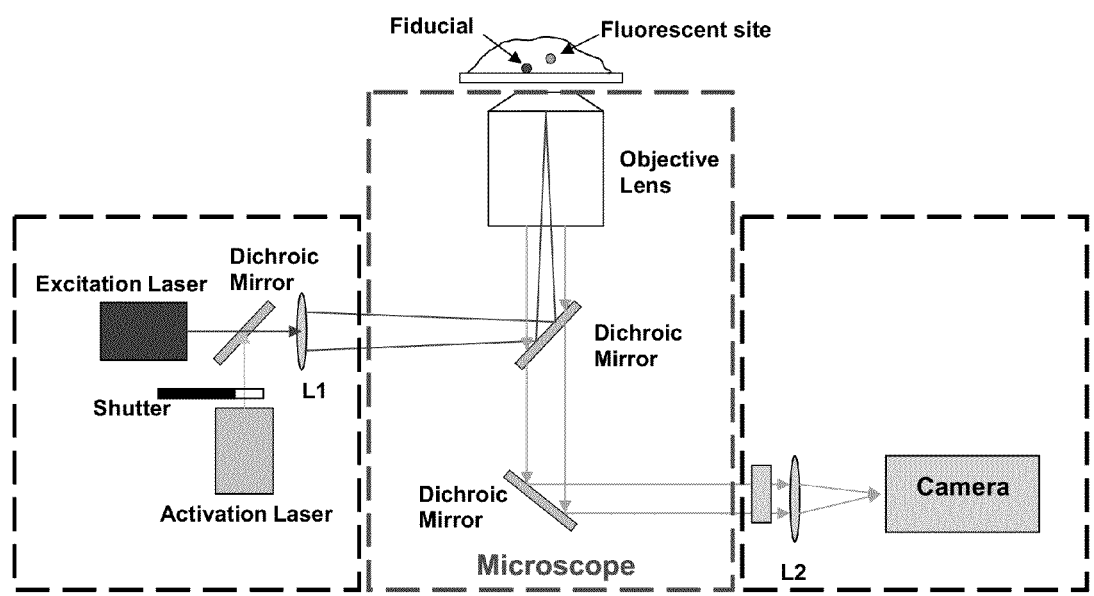
FIG. 1 is a schematic drawing of an apparatus that may be used as a system to stabilize a microscope by correcting the positional drift of a sample viewed under the microscope.

Disclosed are methods, systems and apparatus for stabilizing the image of a sample in the focal plane of an optical microscope, rather than holding the sample to focal distance fixed. The stabilization may be achieved using a closed loop feedback system. The closed loop feedback system may use a sensor signal and a command signal to generate an error signal. The error signal is used by a positioning device to keep the image stable, thus closing the feedback loop.

Three-dimensional information about the position of the target element and the sample is calculated from the image of the fiduciary element on the image sensor. An error signal is formed by comparing the three dimensional position, in time, of the fiduciary element on the image sensor with the commanded (for example, the initial) position of the fiduciary element on the image sensor. By using an appropriate digital control algorithm, the error signal provides the control information used by the positioning device to move the sample in all three dimensions to maintain a constant position of the fiduciary element on the image sensor. In this way, the image of the entire field of view of the microscope is stabilized. One benefit of this method is that the same optical measurement path that is used to image the sample is also used to stabilize the image.

The sensor signal and command signal are generated from a fiduciary element when in focus and are detected by an image sensor, such as a camera. The command signal is generated at an earlier point in time than the sensor signal. The fiduciary element may be contained in the sample containing the target element to be imaged, or may be separate from the sample.

The positioning device is configured to move the sample in the field of view of the microscope with position resolution sufficient to hold the fiduciary element fixed with nanometer-scale accuracy. Positioning devices may include, without limitation, nanopositioning stages, such as a piezo-driven nanopositioning stages. The positioning device may be mounted to the microscope stage which provides coarser position of the sample. The sample holder, such as a microscope slide or coverslip, containing the sample, or displaying the sample on its surface, is typically mounted onto the positioning device.

The image sensor is an instrument that is configured to detect light signals, such as the sensor signal and command signal, emitted from the sample, target element or fiduciary element. Image sensors may include, without limitation, a camera, such as an EMCCD camera, conventional CCD camera or a scientific quality CMOS camera, or a mercury cadmium telluride detector. The image sensor may be used both for image acquisition of the target element in the sample, as well as image acquisition of the fiduciary element that facilitates stabilizing the image by correcting for positional drift of the sample, target element or combination thereof.

While tracking of a single particle with nanometer-scale accuracy is possible, (Carter et al. (2007) Appl Opt 46, 421-427), disclosed herein are methods which stabilize with nanometer-scale accuracy the image from at least one target element, relative to a fiduciary element that is accessible for viewing by the optical microscope. The image sensor that detects that target element, also detects the fiduciary element, such that the optical measurement path that is used to image the sample is also used to stabilize the image. When a plurality of target elements in a sample are sensed or detected, a stabilized image, or a series of stabilized images, may be viewed, taken or saved from the image sensor, such that the position of each target element is known with nanometer-scale accuracy relative to the other target elements in the sample. The stabilization may occur in one, two or three dimensions (x, y and z axis) and for extended periods of time, permitting multiple images from multiple target elements to be rendered and assembled. The methods also permit movement of a single target element to be tracked over time and its relative position in the sample to be imaged with nanometer-scale accuracy.

The fiduciary element has a visible intensity distribution (for example, Gaussian) and is accessible for viewing under the microscope. As an example, a post etched into a glass slide will produce a consistent image from scattered light sufficient to act as a fiduciary element. Exemplary fiduciary elements include, without limitation, quantum dots and fluorescent beads, such as fluorescent-coated polystyrene beads, either as part of the sample or part of the slide or cover slip, a fluorescent stain or other fluorescent particle, a stain labeled molecule, a particle viewed by phase contrast microscopy, or a "dirt" or contaminant particle on the slide. Fiduciary elements may be etched in regular arrays on the microscope slide using micromachining techniques, or placed onto the surface by techniques such as dip pen lithography or activated in a polymer coating by NSOM. The fiduciary element may be an added structure separate from the sample, or may be included with or part of the sample to be imaged, so long as the fiduciary element is accessible for viewing. The fiduciary element may be contained within the field of view of the microscope that includes the target element, or may be outside the field of view and accessed intermittently. The fiduciary may be referenced between each image taken of the one or more target elements, or may be referenced after every $2^{nd}$, $3^{rd}$, $4^{th}$, $5^{th}$, $6^{th}$, $7^{th}$, $8^{th}$, $9^{th}$, $10^{th}$, $15^{th}$, $20^{th}$, $50^{th}$ or $100^{th}$ image.

The fiduciary element, target element, sample or any combination thereof may comprise a label, such as a fluorescent stain or any other particle that is visible when illuminated with light.

Fluorescent stains useful in the practice of the present invention include, but are not limited to, fluoroscein, Texas Red, DAPI, PI, acridine orange, Alexa fluorophores, e.g., Alexa 350, Alexa 405 or Alexa 488, cyanine dyes, e.g., Cy3, coumarin, ethidium bromide, fluorescein, BODIPY, a rhodol, Rox, 5-carboxyfluorescein, 6-carboxyfluorescein, an anthracene, 2-amino-4-methoxynapthalene, a phenalenone, an acridone, fluorinated xanthene derivatives, α-naphtol, β-napthol, 1-hydroxypyrene, coumarins, e.g., 7-amino-4-methylcoumarin (AMC) or 7-amino-4-trifluoromethylcoumarin (AFC), rhodamines, e.g., tetramethylrhodamine, rhodamine-110, or carboxyrhodamine, cresyl violet, resorufin, or a combination thereof.

Other non-limiting examples of useful stains and labels include photo-activatable photo-switchable fluorescent proteins (PAFPs) and small-molecule photo-activatable or photo-switchable fluorophores. Non-limiting examples of PAFPs include Kaede (protein), Eos (protein), IrisFP, KikGR/Kikume, Dronpa, PA-GFP, PS-CFP, KFP1, PS-CFP2, KFP-Red, PA-TagRFP, and FP595. Non-limiting examples of small molecule fluorophores include ATTO532, Rhodamine B, and Alexa Fluor 647, Cy5, Cy5.5, and Cy7 paired with Cy2, Cy3, or Alexa Fluor 405.

The disclosed methods, systems and apparatus may be used with a number of different samples and target elements. Non-limiting examples of samples and target elements include an entire cell, subcellular organelles or compartments such as a mitochondria, the endoplasmic reticulum, a synapse, the growth cone of an extending axon, or the nucleus of a cell; and may also include biological macromolecules and assemblies of macromolecules such as ribosomes, components of the cytoskeleton, DNA, RNA, polynucleotides or synthetic oligonucleotides, proteins, polypeptides, protein complexes, or any combination thereof.

One or more activation sources, such as a light source, which cause a change in or activation of the signal generated by the fiduciary element, the target element or both may be used. Other suitable activation sources, include, without limitation lasers, flash lamps, LED illuminators, black body, tungsten filament lamps, quartz halogen lamps. The selection of activation source will be dictated by the requirements of the particular experiment. An activation source may be used when two or more fluorescent molecules are combined such that energy may be transferred between them. An activation laser provides a wavelength of light that puts the combination into an excited state, such that the combination will fluoresce when illuminated by an excitation source. Typically the activation wavelength is shorter than the excitation and fluorescent wavelengths. In addition, these fluorescent combinations can be photo bleached then re-activated by illuminating with the activation laser.

The methods may be used with a number of different optical microscopes and optical microscopy techniques. Such techniques may produce images with resolutions of at least about 5 nm, at least about 10 nm, at least about 20, nm, at least about 30 nm at least about 40 nm, at least about 50 nm, at least about 60 nm, at least about 70 nm, at least about 80 nm at least about 90 nm, or at least about 100 nm. Non-limiting examples of optical microscopes that may be used include those configured for super-resolution microscopy techniques, live cell imaging systems or any light microscope that requires stability. Non-limiting examples of optical microscopy methods include, without limitation, super resolution microscopy methods, such as STED, RESLOFT, GSD, SSIM, FPALM, PALM, & STORM, live cell imaging and confocal microscopy.

Super-Resolution microscopy methods are subject to positional drift of the sample being imaged, which may be corrected using the disclosed methods, systems and apparatus. Super-Resolution microscopy achieves resolutions beyond the diffraction limit by taking advantage of particular properties of fluorescent or other signal generating probes. Super resolution microscopy techniques are compatible with whole cells, live cells, and other cell-structure-friendly fixation methods. Furthermore, they can be used for multiplex labeling with high molecular specificity, and with biological structures and processes that are intrinsically three-dimensional.

"Localization-based" Super-resolution microscopy methods include FPALM (fluorescence photoactivation localization microscopy), PALM (photoactivation localization microscopy), and STORM (stochastic optical reconstruction microscopy). In localization-based SR imaging, the fluorophore labels may be switched on and off stochastically in sparse subsets while imaging these subsets en masse using, for example, an EMCCD camera. This may be done in the wide-field, or by scanning with lasers. Super-resolution may be achieved by localizing each fluorescent emitter, for example, by computing the center of the point spread function of each emitter as measured by its photon density count on an array of pixels on the camera. A final image may be assembled from a temporally-summed stack of many such image frames from the camera, each of which having localized within it only a small fraction of the total number of the individual fluorescent emitters present in the entire sample field of view.

FPALM (fluorescence photoactivation localization microscopy) and PALM (photoactivation localization microscopy), are related techniques which use photoactivatable fluorescent proteins (PAFPs). PAFPs may be synthesized within the cell in which they are imaged. The polynucleotide encoding the PAFP may be operably connected to a coding sequence for a particular cellular protein of interest such that a fusion protein is produced. Such fusion proteins may be imaged in fixed samples, or in live cells in real time.

STORM (stochastic optical reconstruction microscopy) uses fluorophores that are linked pairs of organic dyes. In some cases, these probes are covalently linked to antibodies directed against the particular protein, or proteins, of interest. These proteins may be labeled using fluorescent immunohistochemistry techniques. STORM probes are exogenously applied to the cell, and may be used for fixed samples. STORM probes may emit a high number of photons per activation cycle, and be resistant to photo-bleaching. A wide number of probes with various absorption and emission wavelengths may be used together in the same sample and then imaged separately. STORM may be used to follow the localization of multiple proteins within a cell simultaneously (multiplex labeling), facilitating investigation of protein co-localization and interactions.

STED (stimulated emission depletion) microscopy spatially restricts fluorophore excitation and emission. In this technique, the excitation volume is reduced through the use of two lasers. The first laser excites the fluorophores, while the second laser turns the fluorophores off. By surrounding the first laser spot by a second one with a donut-shaped intensity profile, and adjusting the intensities these two lasers appropriately, the excitation volume may be reduced below the diffraction limit. The excitation and depletion lasers are scanned rapidly through the sample while the emitted photons are collected, frame-by-frame, by an EMCCD camera as this process proceeds. These frames may then be assembled into a complete image of the entire field. STED may produce images of biological samples with lateral resolutions in the 60 nm range. GSD (ground state depletion) and RESOLFT (reversibly saturable optical fluorescence transitions) are similar to STED.

SSIM (saturated structured illumination microscopy) techniques include illuminating the sample with wide-field patterned light. The excitation pattern interacts with the sample's spatial information resulting in Moiré fringe patterns being produced. The information contained within these fringes can be computationally extracted, and an image of the sample can be calculated using this information that goes beyond the diffraction limit.

FIG. 1 depicts a schematic example of a system and apparatus useful in stabilizing the image of an optical microscope. In FIG. 1, the sample to be imaged is placed on a surface, such as a microscope slide or cover slip. The slide also contains sparsely arrayed fluorescent fiduciary elements which serve as reference points during the imaging experiment.

FIG. 1 shows the slide located on a three-axis fine positioning stage such as a nanopositioner. The image sensor, depicted as an EMCCD camera, detects the image in the system for both stability purposes as well as for experimental sample image acquisition. For stabilization, image data from the camera are processed, and the position of the fiduciary element is determined using localization calculation algorithms carried out by a computer.

Algorithms used for calculating the localizations of both the fiduciary beads and the elements of the sample to be imaged may include any suitable calculations that correct for the positional drift of the fiduciary element and permit closed feedback loop control of the positioning device.

For example, localization of a diffraction limited fiduciary element can be done using a two-dimensional Gaussian approximation of the of the point spread function (PSF) of the imaging system. (Smith et al.)

$$PSF(x,y) = 1/2\pi\sigma^2 * \exp(-(x-\theta_x)-(y-\theta_y)/2\sigma^2),$$

Where $\theta_{x,y}$ are the positions of the fiduciary element. Based on the Gaussian approximation of the PSF and an imaging model, the x and y position (in plane) of the fiduciary element may be calculated.

For a Gaussian, non-Gaussian, or non-diffraction limited fiduciary element image, the center of mass of the fiduciary element image can be used to calculate the x and y positions of the fiduciary element. For a Gaussian, non-Gaussian, or non-diffraction limited fiduciary element image, the z position of the fiduciary element (out of focal plane) may be determined by the width of the fiduciary element image above and below the focal plane. A calibration of fiduciary element width can be made to determine the defocusing that occurs above and below the image plane. The image width in this case does not contain information about whether the fiduciary element is above or below the plane; the computer control algorithm may thus change the focus to make this determination.

The Maximum Likelihood Estimator (MLE) method, seeks to find the best estimate for the position parameters using the PSF(xyz) described above. MLE uses Newton's method in an iterative process to achieve the best estimate of the position, without making assumptions about the form of the intensity distribution of the fiduciary elements intensity distribution on the image sensor used to stabilize the image. See, e.g., Smith et al. (2010) Nat Methods 7, 373-375.

For super resolution microscopy techniques, the optical imaging or measurement path is altered to determine the z position of the fiduciary element. For example, inserting a cylindrical lens into the optical path between the sample and the image sensor creates astigmatism in the point spread function of the system. Above and below the focal point, the image of the fiduciary element becomes elliptical, and the ellipticity of the image is used to calibrate the movement of the fiduciary element above and below the plane (z position). The planar position (x, y) can be calculated from the center of mass of the fiduciary element image. These positions of the fiduciary element are then used as signals that are fed into a software-based, closed-loop feedback control algorithm (e.g. proportional integral controller) which compares the commanded vs. observed position of the fiduciary reference. The control software adjusts the sample position by signaling (i.e. outputting an error signal) to the 3-axis fine positioning stage to move accordingly. With stability thus established in real time in the same manner as the imaging data are collected, these data are immediately available for assembly and analyses during the course of the imaging experiment.

In view of the present disclosure, one of skill in the art would be readily able to adapt and produce other algorithms and software that facilitate the calculation of the location of the fiduciary element in two or three dimensions over time.

The positional drift of the target element or of the sample comprising the target element achieved using the disclosed methods, system and apparatus may be reduced to less than about 50 nm, less than about 45 nm, less than about 40 nm, less than about 35 nm, less than about 30 nm, less than about 25 nm, less than about 20 nm, less than about 15 nm, less than about 14 nm, less than about 13 nm, less than about 12 nm, less than about 11 nm, than about 10 nm, less than about 9 nm, less than about 8 nm, less than about 7 nm, less than about 6 nm, less than about 5 nm, less than about 4 nm, less than about 3 nm, less than about 2 nm, or less than about 1 nm. The positional drift of the target element or of the sample comprising the target element may be less than any of the foresaid amounts in the x-axis, y-axis, z-axis, or any combination of thereof, to provide a stabilized image. For example, the positional drift may be less than about 30 nm, 25 nm, 10 nm, or 5 nm in the z-axis (the optical axis of the microscope), and less than about one or more of 15 nm, 10 nm, 5 nm, 4 nm, 3 nm, or 2 nm in each of the x-axis and y-axis (axes in the plane of the slide, cover-slip, sample or target element), thereby stabilizing the image with nanometer-scale accuracy. The image may be stabilized by these amounts for extended periods of time, such as, for example, at least about 1 minute, at least about 5 minutes, at least about 1 hour, at least about 12 hours, at least about 24 hours, at least about 36 hours, at least about 48 hours, at least about 1 week, at least about 2 weeks, at least about 3 weeks, at least about 4 weeks, at least about 1 month, at least about 2 months, at least about 6 months, or at least about 1 year.

Also disclosed, are methods for sequencing a polymer, such as a polynucleotide or polypeptide, by stabilizing the image, as described herein. For example, the sample may comprise a polymer, such as a polynucleotide, that includes monomers (nucleotides), one or more of which have a photo-activatable probe, label or stain, or a photo-switchable probe, label or stain. Any combination of these probes, labels or stains may be used. The image may be constructed by localization-based super-resolution imaging. This is done using a photo-switchable probe to turn on only a few probes in each image frame, then calculating the position of each probe. In subsequent frames, one or more additional probes are activated and localized until a number, or all, of the probes in the field of view have been localized. The image is then built up from the representation of the position of the localized probes. Stabilizing the image enables the position of differently labeled nucleotides or monomers within the polymer to be determined. The location of the different labels in the polymer chain may be visualized using the stable images generated as disclosed herein, thereby facilitating sequencing of the polymer.

As an example, in a polynucleotide, each type of nucleotide, A, G, C, T/U may be labeled with a different photo-activatable probe, label or stain. For example, in DNA, A nucleotides may be labeled with a first probe type, G nucleotides with a second probe type, C nucleotides with a third probe type and T nucleotides with a fourth probe type. Each probe may fluoresce at a different wavelength and have a different photo-activation wavelength. The sequence of the polynucleotide is then determined by rendering the images taken after each excitation or activation of each probe type, which establishes the localization of the nucleotides within the polynucleotide sequence, and thus the sequence of the polynucleotide.

Further described herein are non-transitory computer readable media which include a series of instructions that are executable on a computational device. The series of instructions may include first, second and third instructions. The first instructions are for processing a command signal received from a camera at a first time-point. The command signal is used to calculate the location or position (for example, the initial location or position) of a fiduciary element, which is held on the nanopositioning stage of an optical microscope. The second instructions are for processing a sensor signal received from the camera at a second time point. The sensor signal is used to calculate the second location of the fiduciary element. The third instructions are for computing an error signal derived from the first calculated location of the fiduciary element, and the second calculated location of the fiduciary element. The error signal provides closed-loop feedback control of the nanopositioning stage, such that the field of view of the optical microscope is stabilized. The stabilization may be achieved in the x axis, y axis and/or z axis, in the amounts described herein.

It will be apparent to those of skill in the art that variations may be applied to the apparatus, systems and methods described herein and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention.

It is to be understood that the invention is not limited in its application to the details of construction and the arrangement of components set forth in the following description. Also, it is to be understood that the phraseology and terminology used herein is for the purpose of description and should not be regarded as limiting. The use of "including," "comprising," "containing", or "having" and variations thereof herein is meant to encompass the items listed thereafter and equivalents thereof as well as additional items.

It is to be understood that any numerical range recited in this specification includes all values from the lower value to the upper value. For example, if a concentration range is stated as 1% to 50%, it is intended that values such as 2% to 40%, 10% to 30%, or 1% to 3%, etc., are expressly enumerated in this specification. It is also to be understood that any numerical range recited in this specification includes all values from at least the lower value without an upper limit, and all values up to the upper value without a lower limit. These are only examples of what is specifically intended, and all possible combinations of numerical values between and including the lowest value and the highest value enumerated are to be considered to be expressly stated in this application.

All methods described in this specification can be performed in any suitable order unless otherwise indicated in this specification or otherwise clearly contradicted by context. Patent applications, patents and literature references cited here are specifically and completely incorporated by reference in their entirety. Where inconsistent interpretations are possible, the present disclosure controls.

The following non-limiting examples are purely illustrative.

Example 1

Figure 2:
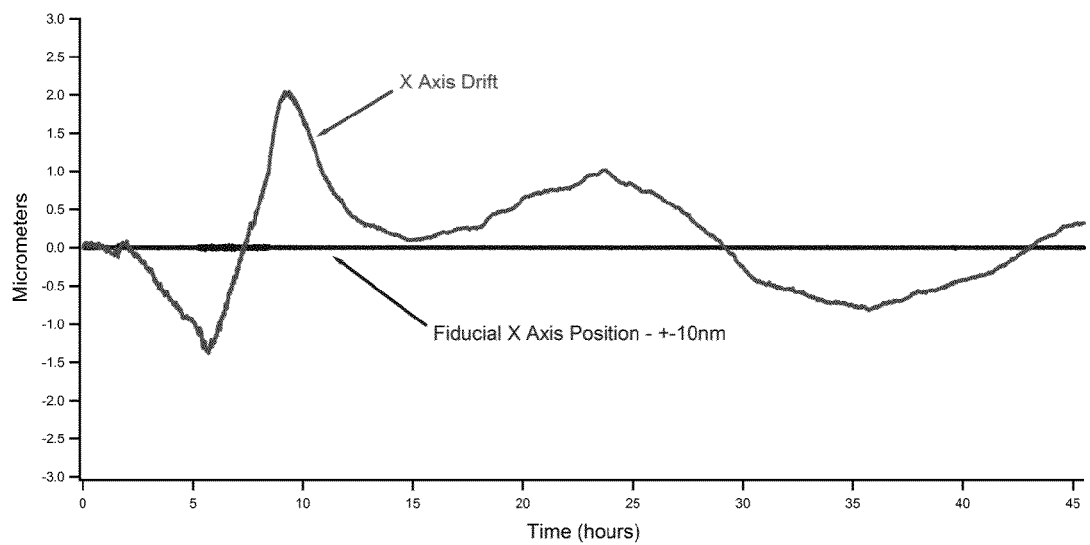
FIG. 2 is a graph showing the stabilization in the x axis of an image of a microscopic bead.
Figure 3:
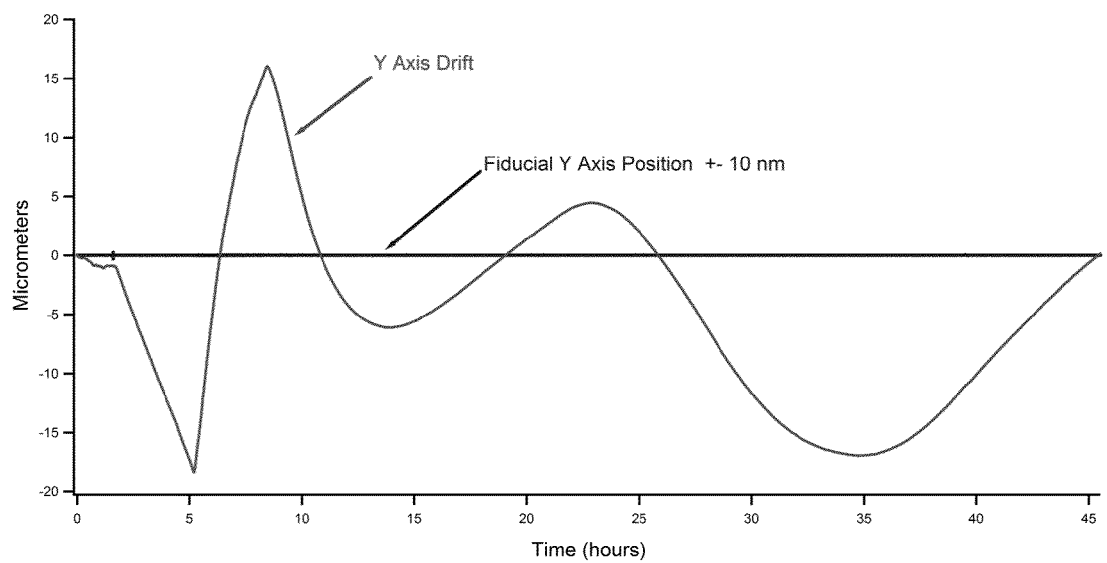
FIG. 3 is a graph showing the stabilization in the y axis of an image of a microscopic bead.
Figure 4:
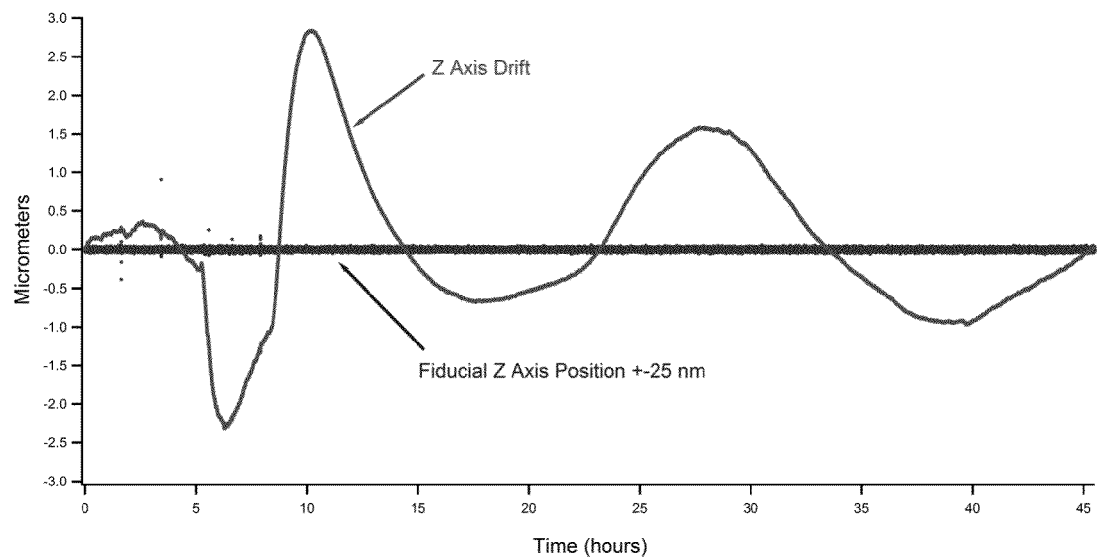
FIG. 4 is a graph showing the stabilization in the z axis of an image of a microscopic bead.

An inverted optical microscope was built using off the shelf optical components, and a commercial 100×, 1.4NA objective lens. The system included an EMCCD camera as image sensor and a laser diode as the light excitation source. The setup was similar to that depicted in FIG. 1. The EMCCD camera was mounted on a vibration isolation table, and an electric fan dissipated the heat generated from the thermoelectric cooler that is used to cool the EMCCD camera. A 3-axis nanopositioner was used to effect the fine movement of the sample for stabilization. The sample was a microscope slide with 1 µm fluorescent coated polystyrene beads. The beads were coated with Cy5 which fluoresces at about 660 nm when excited with 635 nm laser light. The beads were sparsely dispersed over the microscope. The image of a selected bead was use as a fiduciary element to stabilize the image of a bead for 45 hours. The beads position was calculated in every frame and a PID control loop in conjunction with the nanopositioner was used to correct for image drift over the entire 45 hours. FIG. 2, FIG. 3 and FIG. 4 demonstrate the bead image stability for the X, Y and Z axis of the sample, respectively. The Z axis is the optical axis of the microscope and X and Y are in the plane of the slide. The image of the bead was held to within +−10 nm (plus or minus 10 nm) in X and Y and +−25 nm (plus or minus 25 nm) in Z for over 45 hours. The lines labeled "X axis drift", "Y axis drift" and "Z axis drift" in FIGS. 2 to 4, respectively, depict the motion of the nanopositioner required to keep the images of the beads fixed, and represent the system drift over the 45 hour experiment.

Prophetic Example 2

An inverted optical microscope is built using off the shelf optical components, and a commercial 100×, 1.4NA objective lens. The system setup is similar to that described in Example 1, except that it is optimized to reduce noise. For example, the electric fan used to cool the thermoelectric cooler of the EMCCD camera is replaced with a water-cooling system. Alternatively, the EMCCD camera is replaced with a different camera having an increased the frame rate. By increasing the frame rate, signal averaging can be used to reduce the system noise by $1/\sqrt{n}$, where n is the number of positions averaged. A third system set up includes both the water cooling system, and the replacement of the EMCCD camera with a camera having an increased the frame rate. Increasing the frame rate and/or eliminating fan vibration is expected to generate images in which the bead is held to within +/−2 nm in X and Y axes and +/−5 nm in Z axis for at least 48 hours.

Prophetic Example 3

Sequencing of DNA Using Light Microscopy

1. Labeling DNA with Fluorophores

DNA will be labeled with fluorophores by either labeling with fluorescent nucleotide conjugates for direct enzymatic labeling using DNA polymerase, or by using derivatized nucleotides, such as nucleotides derivatized with aminoallyl groups, that permit chemical addition of fluorophores after enzymatic incorporation of the respective derivative. The following steps will be carried out: Combine 1 ng/µl template DNA with specific DNA sequencing primer, heat to 95° C. and cool to room temperature to anneal, then place on ice.
   a. A reaction mixture is assembled with the following:
      i. 5 µl 10× sequencing buffer
      ii. 1 µl of 1 ng/µl template-primer mix
      iii. 1 µl 10 mM fluorescently labeled, or appropriately derivatized dNTPs
      iv. 2.5 units DNA polymerase (e.g, T4, T7, or Klenow)
      v. dH$_2$O to bring final volume to 50 µl.
   b. Mix gently.
   c. Incubate at 37° C. for 30 minutes.
   d. If nucleotides are directly modified, the DNA is purified from unincorporated nucleotides, immobilized on the slide, and imaged.
   e. Derivatized nucleotide labeling is done by first column purifying the synthesized DNA from unincorporated nucleotides, denaturing, and carrying out specific chemistry to link the fluorophore at the modified nucleotide. The labeled DNA can then be purified again, as above, immobilized on the slide, and imaged.

2. Immobilization of Labeled DNA on Microscope Slide

Covalently conjugating active silyl moieties onto labeled DNA fragments enables their routine immobilization onto glass microscope slides.
   a. 5' thiol-labeled DNA is generated by using 5' thiol-labeled primers during the DNA labeling procedure outlined above.
   b. Mercaptosilane is diluted to 5 mM in NaOAc (30 mM, pH 4.3).
   c. 1 nmol of labeled DNA is added to a reaction mixture with 5 nmol of mercaptosilane in 20 µl of the same buffer.
   d. ncubate at RT for 30 minute to 2 hours.
   e. Dilute reaction to desired concentration and directly deposit onto microscope slide with a micro-pipette.
   f. Dry slide at 50° C. for 10 minutes.
   g. Add glycerol-based mounting media to slide to cover immobilized DNA.
   h. Add cover slip, and seal for imaging.

3. Localization-Based Super-Resolution Imaging of Labeled DNA

DNA Direct imaging of the immobilized fluorescently labeled DNA will be used to determine their respective base order sequences. Each base will be labeled with one of different spectrally separable fluorophores, such as Cy2 (ex. 492 nm, em. 510 nm), Cy3 (ex. 550 nm, em. 570 nm), Cy5 (ex. 650 nm, em. 670), and Cy5.5 (ex. 673 nm, em. 707 nm), as well as the AlexaFluor dyes, A405 (ex. 402 nm, em. 421 nm), A488 (ex. 495 nm, em. 519 nm), A647 (ex. 650 nm, em. 668 nm), and A750 (ex. 749 nm, em. 775 nm). The core stabilization strategy will allow repeated activation cycles of each fluorophore at its respective sequence position. Photon outputs detected at the EMCCD camera per activation-imaging cycle range from approximately 1000 (for A488) to 10,000 (for Cy3). Between 50,000 to 100,000 photons from each individual fluorophore will need to be recorded on the pixels of the EMCCD detector to accomplish sufficiently accurate emitter localizations for base assignment. Repeated activation-imaging cycles (which will vary from 10-100 cycles, depending on the fluorophores used) will enable sufficient photon numbers to be collected from each emitting fluorophore to enable the sub-nanometer localization confidences required for assigning unambiguous base orders. DNA sequences of 100-500 nucleotides are expected to be detected and assigned base order by imaging the fluorescently labeled nucleotides.

Various features and advantages of the invention are set forth in the following claims.

What is claimed is:

1. A method of stabilizing an image generated by an optical microscope comprising:
   (a) applying a light source to a sample and a fiduciary element held on a nanopositioning stage, the sample comprising a target element and having a positional drift;
   (b) detecting photons emitted from the fiduciary element and the target element with an image sensor, wherein the photons emitted by the fiduciary element and the target element are detected by the same image sensor; and
   (c) correcting the positional drift of the sample using an algorithm configured to calculate the location of the fiduciary element and having closed-loop feedback control of the nanopositioning stage, thereby stabilizing the image,
   wherein the fiduciary element has an imaged point spread function, and wherein the algorithm calculates at least one of
      an arithmetic center-of-mass on the imaged point spread function to locate the fiduciary element,
      a center of any least-squares fitting to a Gaussian distribution on the imaged point spread function to locate the fiduciary element, and
      the center of a Gaussian distribution using a Maximum Likelihood Estimator calculation method on the imaged point spread function.

2. The method of claim 1, wherein the image is a three-dimensional image and is stabilized in all three dimensions.

3. The method of claim 1, wherein the nanopositioning stage is a three-axis, nanopositioning stage.

4. The method of claim 3, wherein the image of the target element is contained within a field of view, and wherein the fiduciary element is within the field of view.

5. The method of claim 4, wherein the sample comprises the fiduciary element.

6. The method of claim 4, wherein the sample comprises a cell, and wherein the fiduciary element is contained within the cell.

7. The method of claim 1, wherein the image of the target element is contained within a field of view, wherein the fiduciary element is outside the field of view, and wherein the photons are detected from the fiduciary element intermittently.

8. The method of claim 7, wherein the sample comprises the fiduciary element.

9. The method of claim 8, wherein the sample comprises a cell, and wherein the fiduciary element is contained within the cell.

10. The method of claim 1, wherein the positional drift of the sample is corrected in step (c) to less than about 50 nm in at least one dimension.

11. The method of claim 10, wherein the positional drift of the sample is corrected in step (c) to less than about 10 nm in at least one dimension.

12. The method of claim 1, wherein the image is stabilized for at least about 1 hour.

13. The method of claim 1, wherein the sample comprises at least two target elements which are stabilized in the image relative to each other.

14. The method of claim 1, wherein the algorithm calculates an arithmetic center-of-mass on the imaged point spread function to locate the fiduciary element.

15. The method of claim 1, wherein the algorithm calculates a center of any least-squares fitting to a Gaussian distribution on the imaged point spread function to locate the fiduciary element.

16. The method of claim 1, wherein the algorithm calculates the center of a Gaussian distribution using a Maximum Likelihood Estimator calculation method on the imaged point spread function.

17. A method for sequencing a polynucleotide comprising
   (a) stabilizing the image generated by an optical microscope according to claim 1, wherein the sample comprises a polynucleotide comprising a photo-activatable probe, a photo-switchable probe or a combination thereof, and wherein the image is detected by localization-based super-resolution imaging; and
   (b) rendering the sub-diffraction-limited image to establish the localization of a nucleotide within the polynucleotide sequence.

18. The method of claim 17, wherein the polynucleotide comprises a plurality of different photo-activatable probes, photo-switchable probes or a combination thereof, and wherein a plurality of sub-diffraction-limited images are rendered and assembled.

19. A system for stabilizing an image generated by an optical microscope comprising:
   (a) a light source configured to provide light to a sample and a fiduciary element held on a nanopositioning stage, the sample comprising a target element and having a positional drift;
   (b) an image sensor, configured to detect photons emitted by the fiduciary element and the target element; and
   (c) a computer comprising an algorithm configured to calculate the location of the fiduciary element and having closed-loop feedback control of the nanopositioning stage, thereby stabilizing the image of the optical microscope,
   wherein the fiduciary element has an imaged point spread function, and wherein the algorithm calculates at least one of
      an arithmetic center-of-mass on the imaged point spread function to locate the fiduciary element,
      a center of any least-squares fitting to a Gaussian distribution on the imaged point spread function to locate the fiduciary element, and
      the center of a Gaussian distribution using a Maximum Likelihood Estimator calculation method on the imaged point spread function.

20. An apparatus for stabilizing an image generated by an optical microscope comprising:
   (a) a light source configured to provide light to a sample and a fiduciary element held on a nanopositioning stage, the sample comprising a target element and having a positional drift;

(b) an image sensor, configured to detect photons emitted by the fiduciary element and the target element; and
(c) a computer comprising an algorithm configured to calculate the location of the fiduciary element and having closed-loop feedback control of the nanopositioning stage,
wherein the fiduciary element has an imaged point spread function, and wherein the algorithm calculates at least one of
an arithmetic center-of-mass on the imaged point spread function to locate the fiduciary element,
a center of any least-squares fitting to a Gaussian distribution on the imaged point spread function to locate the fiduciary element, and
the center of a Gaussian distribution using a Maximum Likelihood Estimator calculation method on the imaged point spread function.

21. A non-transitory computer readable medium comprising
first instructions executable on a computational device for processing a command signal received from a camera at a first time point, the command signal being used to calculate the first location of a fiduciary element held on a nanopositioning stage of an optical microscope having a field of view,
second instructions executable on the computational device for processing a sensor signal received from the camera at a second time point, the sensor signal being used to calculate the second location of the fiduciary element;
third instructions executable on the computational device for computing an error signal derived from the first calculated location of the fiduciary element, and the second calculated location of the fiduciary element, wherein the error signal provides closed-loop feedback control of the nanopositioning stage, such that the field of view of the optical microscope is stabilized,
wherein the fiduciary element has an imaged point spread function, and wherein the algorithm calculates at least one of
an arithmetic center-of-mass on the imaged point spread function to locate the fiduciary element,
a center of any least-squares fitting to a Gaussian distribution on the imaged point spread function to locate the fiduciary element, and
the center of a Gaussian distribution using a Maximum Likelihood Estimator calculation method on the imaged point spread function.

* * * * *